United States Patent [19]

Kanda

[11] Patent Number: 5,450,252

[45] Date of Patent: Sep. 12, 1995

[54] HARD DISK DRIVE INCLUDING MOVING MEANS FOR MOVING A RECORDING/REPRODUCING HEAD AND HAVING A NOISE CANCELER UTILIZING SERIES-CONNECTED FILTERS IN PARALLEL WITH THE MOVING MEANS

[75] Inventor: Hiroyuki Kanda, Tokyo, Japan

[73] Assignee: Kabushiki Kaisha Toshiba, Kanagawa, Japan

[21] Appl. No.: 197,396

[22] Filed: Feb. 16, 1994

[30] Foreign Application Priority Data

Feb. 19, 1993 [JP] Japan .................................. 5-030637

[51] Int. Cl.$^6$ .............................................. G11B 5/00
[52] U.S. Cl. ...................................... 360/55; 333/172; 358/336; 358/342
[58] Field of Search ............... 358/336, 340, 315, 335, 358/342; 348/607, 241, 535, 622; 360/55, 21, 30, 33.1; 455/306, 307, 189.1; 333/172, 181; 307/520; 328/167; 381/71

[56] References Cited

U.S. PATENT DOCUMENTS

| | | | |
|---|---|---|---|
| 4,079,423 | 3/1978 | Diehl | 348/241 |
| 4,254,436 | 3/1981 | Harford | 348/535 |
| 4,342,059 | 7/1982 | Wray | 360/55 X |
| 4,403,346 | 9/1983 | Ogawa | 455/189.1 |
| 4,460,929 | 7/1984 | Bader | 360/30 |
| 4,677,487 | 6/1987 | Tomita et al. | 348/622 |
| 4,896,220 | 1/1990 | Sato | 360/21 X |
| 5,138,663 | 8/1992 | Moseley | 381/71 |
| 5,257,109 | 10/1993 | Minakawa | 360/33.1 X |

*Primary Examiner*—Donald Hajec
*Assistant Examiner*—Patrick Wamsley
*Attorney, Agent, or Firm*—Limbach & Limbach

[57] ABSTRACT

A hard disk drive includes a head for recording/reproducing data on a recording medium, a motor for moving the head on the recording medium, a motor driver for supplying a driving current to the motor, a data processing circuit for processing data reproduced from the head or record data given to the head, and a cable which has a current line connecting between the motor driver and the motor and a data line connecting between the data processing circuit and the head. The motor has been connected with a noise canceler comprising series-connected first and second filters in parallel with the motor. The connecting point of the first and the second filters of the noise canceler is grounded. A noise generated from the motor driver flows to a ground via the connecting point of the first and the second filters and is cancelled.

18 Claims, 4 Drawing Sheets

PRIOR ART

HARD DISK DRIVE INCLUDING MOVING MEANS FOR MOVING A RECORDING/REPRODUCING HEAD AND HAVING A NOISE CANCELER UTILIZING SERIES-CONNECTED FILTERS IN PARALLEL WITH THE MOVING MEANS

BACKGROUND OF THE INVENTION

1. Field of the Invention

The present invention relates to a hard disk drive equipped with a noise canceler to prevent noise, introduced by a driving current, from being supplied to a voice coil motor which moves a magnetic head.

2. Description of the Related Art

A voice coil motor (hereinafter referred to as a VCM) is generally used on a hard disk drive as a driving source for moving a carriage which is supporting a magnetic head. The carriage is driven by a driving current supplied to the VCM. When the carriage is driven, the magnetic head supported on the end of the carriage moves in the radial direction of a recording medium (disk) for data recording or reproducing.

An existing VCM driving system is composed of a printed circuit board (hereinafter referred to as a PCB), a flexible printed cable (hereinafter referred to as a FPC) and a VCM.

There are provided a resistor for adjusting a driving current being supplied to the VCM and a motor driver comprising a plurality of transistors as switching devices on the PCB. In addition, the PCB is provided with a lowpass filter comprising a resistor and a capacitor. The FPC is provided with a VCM current line for connecting the motor driver on the PCB to the VCM. Furthermore, the FPC is provided with various signal lines such as data lines for data transfer between the magnetic head and a read/write circuit provided on the PCB.

When driving the VCM in the construction as described above, in order to get the magnetic head to seek in the positive direction (for instance, in the inner peripheral direction of a disk) or the negative direction (for instance, in the outer peripheral direction of a disk) it is necessary to flow a driving current being supplied to the VCM in a first direction or a second direction which is opposite to the first direction. For this purpose, a switching circuit has been composed by a plurality of transistors as described above.

When driving the VCM, the driving current is applied in the first direction in order to move the magnetic head in the positive direction by turning some of the transistors on selectively and by turning the remaining transistors off. On the contrary, the driving current is applied in the second direction in order to move the magnetic head in the negative direction by turning on the transistors which were turned off when moving the magnetic head in the positive direction and by turning off those transistors which were turned on at the time.

As described above, on the VCM driving system, the magnetic head is moved in the positive or negative direction by applying the driving current to the VCM by turning on/off a plurality of transistors comprising a switching circuit provided in the PCB.

Here, there is such a problem that a switching noise is generated when the transistors are selectively turned on/off. For the purpose of cancelling this switching noise, lowpass filters comprising resistors and capacitors have been provided in the PCB.

In an existing VCM driving system, however, these lowpass filters were simply incorporated in parallel with the VCM so far and therefore, there was such a defect that a noise which couldn't be cancelled, that is, a leakage component (a high frequency component) of the noise flows into the VCM current line in the FPC.

Up to now, the VCM current line was provided using a separate cable different from a data line to the magnetic head. However, according to demands for downsizing a hard disk drive in recent years, the VCM current line has come to be provided on the FPC on which a data line is also provided. So, there were such problems-that if an uncancelled noise was on the VCM current line, the data line was also adversely affected, resulting in drop of data recording/reproducing accuracy and the like.

SUMMARY OF THE INVENTION

The present invention has been made in view of the circumstances described above, and it is an object of this invention to provide a hard disk drive with data recording/reproducing accuracy improved by certainly cancelling a noise generated by the VCM driving system, thereby preventing its adverse effect given on the recording/reproducing system.

According to the present invention, there is provided a hard disk drive comprising means for recording/reproducing dam on/from a recording medium; means for moving the recording/reproducing means on the recording medium; means for supplying a driving current to the moving means; means for processing dam reproduced from the recording/reproducing means or recording data given to the recording/reproducing means; cable means for connecting between the current supplying means and moving means as a current line and between the data processing means and the recording/reproducing means as a data line; means for cancelling noise, the cancelling means including series-connected first and second filters connected to the moving means in parallel with the moving means for cancelling noise; and means for grounding the connecting point of the first and the second filters of the noise cancelling means.

DESCRIPTION OF THE DRAWINGS

The accompanying drawings, which are incorporated in and constitute a part of the specification, illustrate a presently preferred embodiment of the invention, and together with the general description given above and the derailed description of the preferred embodiment given below, serve to explain the principles of the invention.

DETAILED DESCRIPTION OF THE PREFERRED EMBODIMENT

Hereinafter, a preferred embodiment of the present invention will be described in detail with reference to the drawings.

Figure 1:
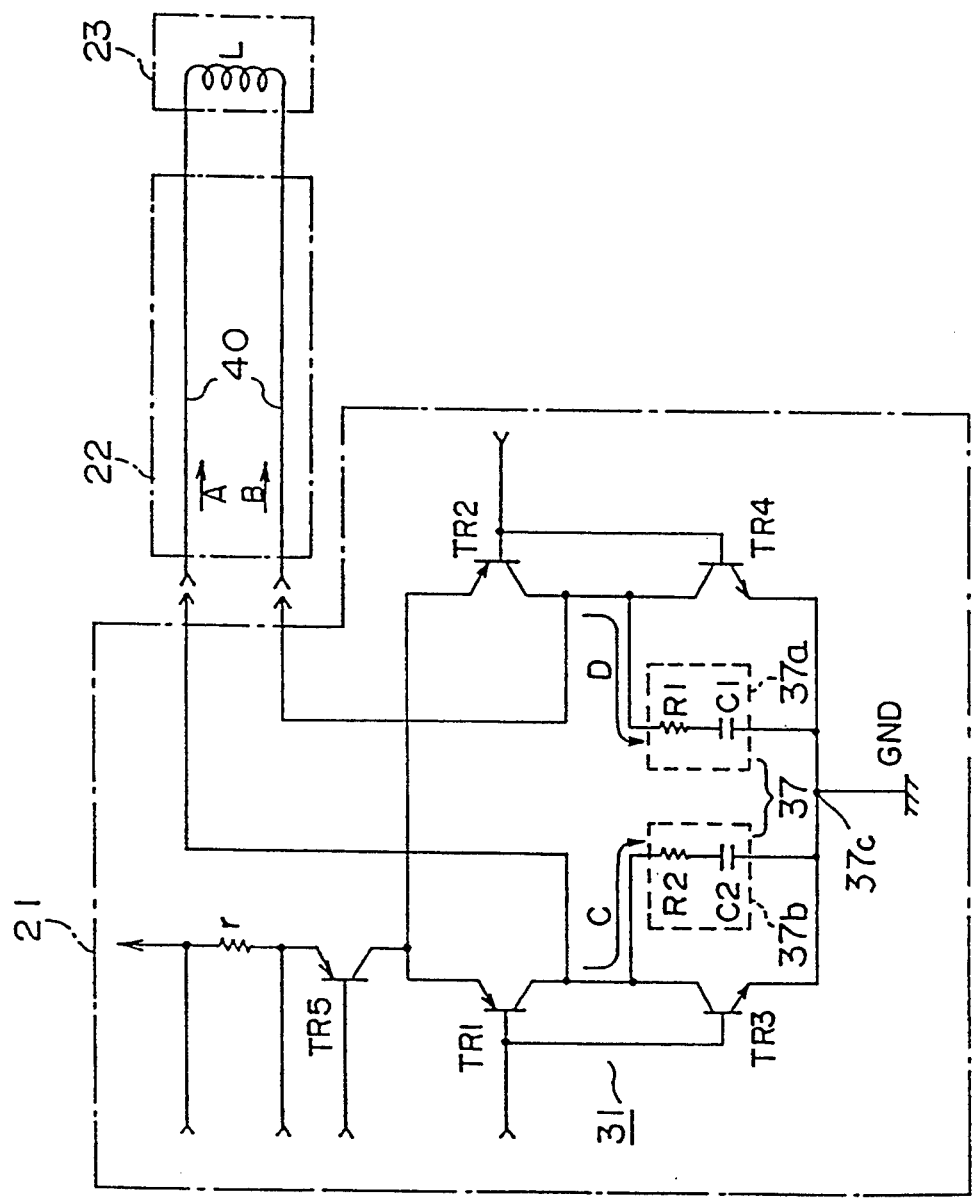
FIG. 1 is a circuit diagram showing the construction of a VCM driving system of a hard disk drive involved in a preferred embodiment of the present invention.

FIG. 1 shows the construction of a VCM driving system of the hard disk drive of the present invention. The VCM driving system is composed of a printed circuit board (hereinafter referred to as PCB) 21, a flexible printed cable (hereinafter referred to as FPC) 22 and a voice coil motor (hereinafter referred to as VCM) 23 as a means for moving a magnetic head 43 which will be described later.

Figure 2:
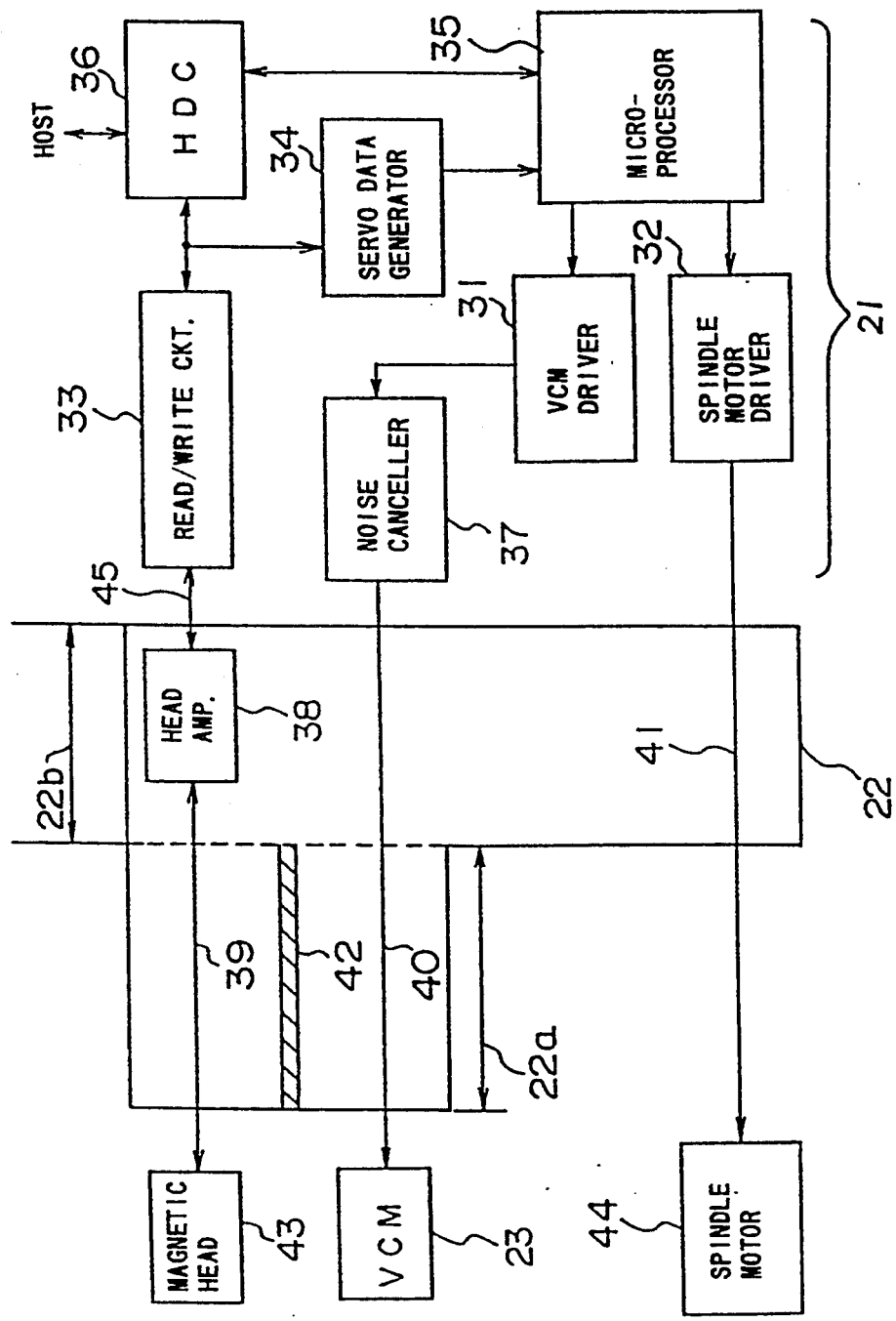
FIG. 2 is a block diagram showing the entire construction of the hard disk drive including the VCM driving system illustrated in FIG. 1.

There are provided on the PCB 21 a VCM driver 31 as a current supply means for supplying a driving current to the VCM 23 to drive it and in addition, such various circuits as a spindle motor driver 32, a read/write circuit 33 as a data processing means, a servo data generator 34, a microprocessor 35 and a hard disk controller (hereinafter referred to as HDC) 36 as shown in FIG. 2. Of these circuits, the VCM driver 31 is composed of a resistor r and transistors TR1 to TR5 as shown in FIG. 1. The resistor r is used for deciding a value of driving current to be supplied to the VCM 23. The transistors TR1 to TR4 are used as switching circuits for supplying a driving current in the arrow direction A or B according to the moving direction of the magnetic head. The transistor TR5 is a switching transistor which is turned on when driving the VCM. Other circuits will be described later when explaining FIG. 2.

There is a noise canceler 37 provided in the PCB 21 as shown in FIGS. 1 and 2. This noise canceler 37 has been provided for cancelling a switching noise generated from the VCM driving system and is composed of a first lowpass filter 37a comprising a resistor R1 and a capacitor C1, and a second lowpass filter 37b comprising a resistor R2 and a capacitor C2 as shown in FIG. 1.

These two lowpass filters 37a and 37b have been connected in series via a connecting point 37c. These series connected lowpass filters 37a and 37b have been connected in parallel with the VCM 23. The connecting point 37c has been grounded to GND and it is thus possible to cancel a switching noise generating from the VCM driving system at the PCB 21 side.

The FPC 22 is composed of a flexible film with a conductive wiring pattern printed so as to form a plurality of current lines. This FPC 22 has a movable portion 22a which bends according to the movement of an object electrically connected thereto and a fixed portion 22b which is fixed to the bottom of a housing 20 that will be described later. There are a read/write data line 39, a spindle motor current line 41, etc. formed on the FPC 22 in addition to a VCM current line 40 which connects the VCM driver 31 and the VCM 23 as shown in FIG. 2. Further, there is a head amplifier 38 as an amplifying means mounted on the fixed portion 22b of this FPC 22. There is also an grounded line 42 formed in the FPC 22. This grounded line 42 will be explained later in FIGS. 3 and 4.

The VCM 23 has been provided with a coil L. A driving current is supplied to the coil L via the FPC 22 from the VCM driver 31 which serves as a current supply means.

FIG. 2 is a block diagram showing the construction of the entire hard disk drive of the present invention including the VCM driving system as explained in FIG. 1. In FIG. 2, the VCM driver 31 drives the VCM 23 according to a control signal from the microprocessor 35. The spindle motor driver 32 drives a spindle motor 44 according to a control signal from the microprocessor 35. The read/write circuit 33 executes the processing of reproduced signals from the magnetic head 43 or recorded signals to be given to the magnetic head 43. The servo data generator 34 generates servo data required for the seek control of the magnetic head 43 based on the reproduced signal processed by the read/write circuit 33. The microprocessor 35 controls the VCM driver 31 based on the servo data provided from the servo data generator 34. The HDC 36 functions as an interface with a host computer. The noise canceler 37 cancels a switching noise of the VCM driving system as explained in FIG. 1. The circuits described above have been mounted on the PCB 21.

The head amplifier 38 amplifies the signal level of reproduced signals from the magnetic head 43 or control recorded signals to be given to the magnetic head 43. The read/write data line 39 is a signal line connecting the head amplifier 38 mounted on the FPC 22 to the magnetic head 43. The VCM current line 40 is a current line connecting the VCM driver 31 on the PCB 21 to the VCM 23. The spindle motor current line 41 is a current line connecting the spindle motor driver 32 on the PCB 21 to the spindle motor 44. The grounded line 42 is a stabilized power line arranged between the read/write data line 39 and the VCM current line 40 in parallel with them. The head amplifier 38 and the signal lines 39 to 41 have been provided in the FPC 22. The stabilized power line is a line having a function to maintain an equivalent stabilized electrical potential. In this embodiment, the stabilized power line is realized as the grounded line 42. However, it is not limited to the grounded line 42. For instance, the stabilized power line may be realized by a DC plus line or minus line.

Figure 3:
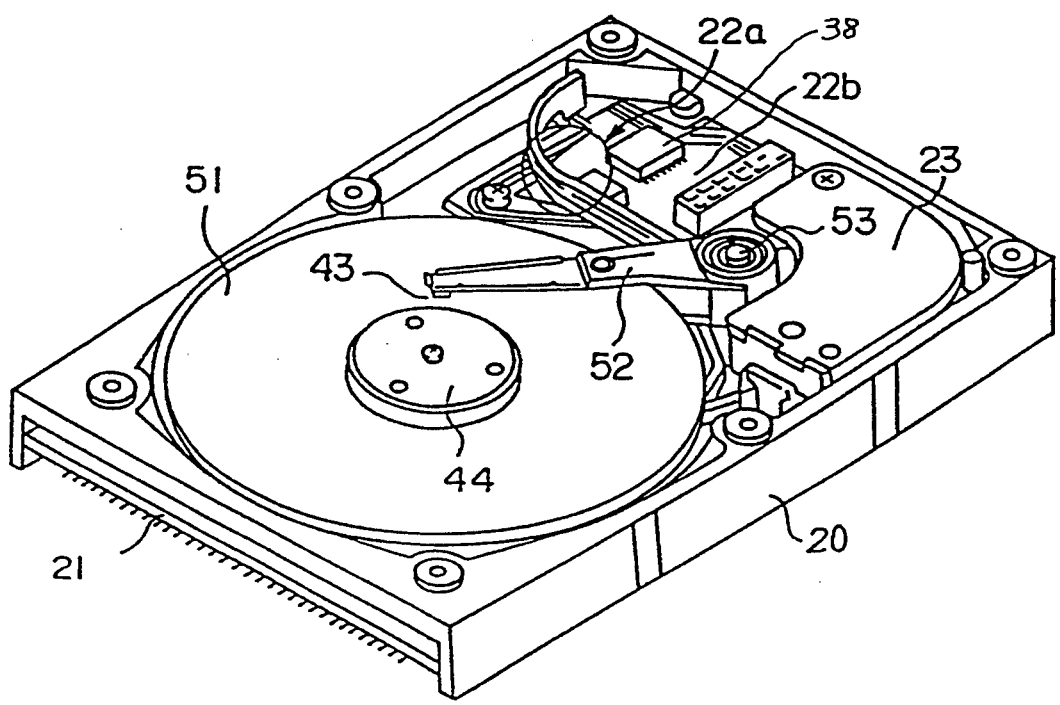
FIG. 3 is a perspective view showing the internal construction of the hard disk drive of the present invention with its top cover opened.

The magnetic head 43 is moved in the radial direction of a recording medium (a magnetic disk) 51 via a carriage 52 shown in FIG. 3. The VCM 23 is a motor used to move the carriage 52. The spindle motor 44 is a motor to rotate the recording medium 51.

FIG. 3 is a perspective view showing the internal construction of the hard disk drive of the present invention. In FIG. 3, the recording medium 51 has been arranged to occupy almost half of the area in the thin box type housing 20. The recording medium 51 is rotated in the prescribed direction by the driving force of the spindle motor 44. The magnetic head 43 records data on the rotating recording medium 51 or reproduces data therefrom. The magnetic head 43 is supported by the carriage 52. The carriage 52 is mounted in the rotatable state with its shaft 53 as a supporting point and is swung by the driving force of the VCM 23. With the swing of the carriage 52, the magnetic head 43 moves in the radial direction of the recording medium 51.

Circuits needed for driving the mechanisms described above have been mounted on the PCB 21 to which the FPC 22 is connected. The PCB 21 has been fixed to the bottom of the housing 20. The fixed portion 22b of the FPC 22 has been fixed to the bottom of the housing 20 and the end of the movable portion 22a has been mounted to the carriage 52. The movable portion 22a moves with the swing of the carriage 52.

There are arranged the read/write data line 39 and the VCM current line 40 in parallel with each other in the FPC 22 as described in FIG. 2. Here, there is such a problem that if a noise is on the VCM current line 40 in the FPC 22, the read/write data line 39 is also adversely affected.

Figure 4:
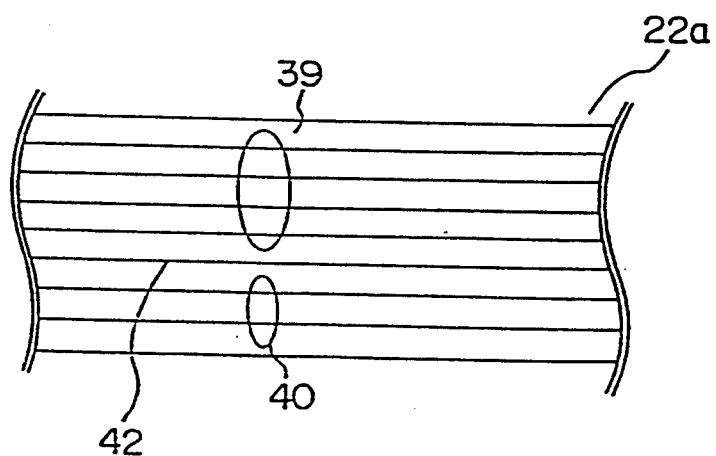
FIG. 4 is a rough sketch showing the construction of signal lines in a FPC (Flexible Printed Cable)

In this embodiment an effect of noise given on the read/write data line 39 is prevented by arranging the grounded line 42 between the read/write data line 39 and the VCM current line 40 in parallel with them as shown in FIG. 4. The grounded line 42 has been formed at least within the range of the movable portion 22a of the FPC 22.

Next, the operation of the hard disk drive of the present invention will now be described.

As shown in FIG. 1, when driving the VCM 23, it is necessary to apply a driving current to be supplied to the VCM 23 in the arrow direction A or B, in order to move the magnetic head 43 shown in FIG. 3 in the positive or the negative direction. The switching circuit for this purpose is composed of the transistors TR1 to TR4. Whenever the VCM 23 is being driven, the transistor TR5 is always kept in the on condition. When a driving current flows in the arrow direction A, the transistors TR1 and TR4 are turned on and the transistors TR2 and TR3 are turned off. On the contrary, when a driving current flows in the arrow direction B, the transistors TR2 and TR3 are turned on and the transistors TR1 and TR4 are turned off.

Thus, by turning the transistors TR1 to TR4 on/off, a driving current is supplied to the VCM 23 to move the magnetic head 43 in the positive or the negative direction.

When the transistors TR1 to TR4 are turned on/off, a switching noise is generated. This switching noise will be cancelled by the noise canceler 37 comprising the first lowpass filter 37a and the second lowpass filter 37b. In this invention, the connecting point 37c of the first lowpass filter 37a and the second lowpass filter 37b has been connected to the grounded (GND). As a result, even when there is an uncancelled noise, that is, a noise leakage component (a high frequency component), it is possible to flow it into the ground (GND).

That is, when a driving current is flown in the arrow direction A by turning the transistors TR1 and TR4 on and the transistors TR2 and TR3 off, a switching noise generated at the time flows in the arrow direction C and is cancel led by the lowpass filter 37b. A noise leakage component that couldn't be cancelled at this time is flown to the outside, that is, into GND without being flown backward. On the other hand, when a driving current is flown in the arrow direction B by turning the transistors TR2 and TR3 on and the transistors TR1 and TR4 off, a switching noise generated at the time flows in the arrow direction D and is cancelled by the lowpass filter 37a in the same manner as above. A noise leakage component that couldn't be cancelled at the time is flown to the outside, that is, into GND without being flown backward.

As described above, a switching noise of the VCM driving system can be certainly cancelled at the PCB 21 side. Therefore, a switching noise will never be introduced in the VCM current line 40 in the FPC 22 and as a result, it is possible to prevent an adverse effect given on the read/write data line 39. Thus, in the recording/reproducing system it is possible to always obtain normal reproduced or recorded data and to execute the proper data recording/reproducing.

Further, as the grounded line 42 has been arranged between the read/write data line 39 and the VCM current line 40 in parallel with them in this invention as shown in FIG. 4, even when a switching noise is on the VCM current line 40, it is possible to certainly prevent an adverse effect by the switching noise given on the read/write data line 39.

Figure 5A:
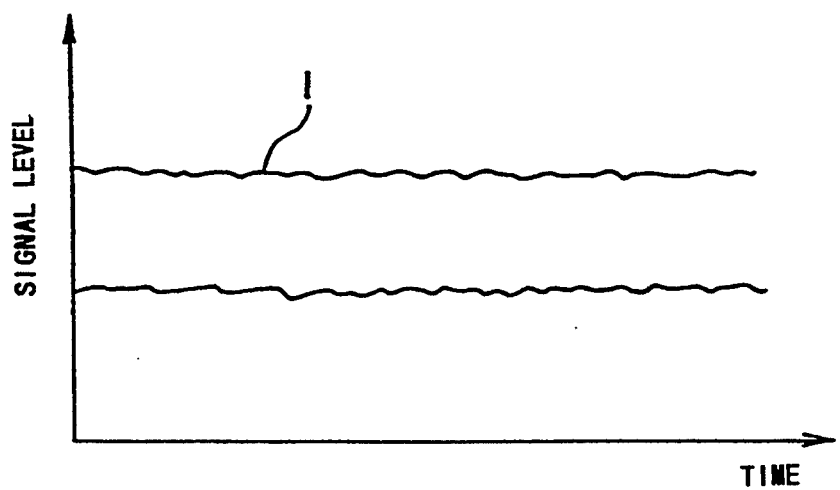
FIGS. 5A and 5B are graphs showing a noise cancelling effect by the hard disk drive of the present invention compared with that of a conventional hard disk drive.
Figure 5B:
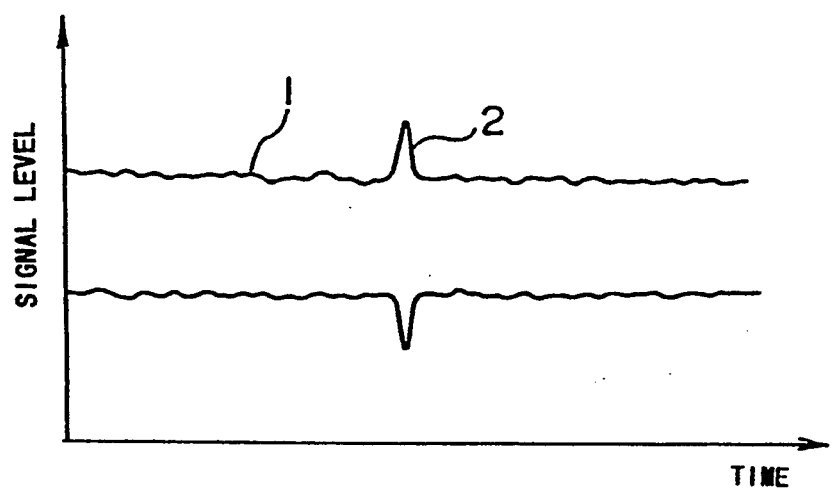

A noise cancelling effect obtained by the hard disk drive of the present invention compared with that by conventional hard disk drive is shown in FIGS. 5A and 5B. Shown in FIGS. 5A and 5B are waveform diagrams when signals on the read/write data line 45 shown in FIG. 2 were observed at the time of read with a synchroscope. FIG. 5A is a waveform diagram in the case of the present invention and FIG. 5B is that in the case of a conventional hard disk drive.

As shown in FIG. 5B, a steadily generated high frequency noise 1 and a singularly generated switching noise 2 of the VCM driving system were observed in the case of a conventional hard disk drive. If the present invention is implemented, the switching noise 2 of the VCM driving system is cancelled and the high frequency noise 1 only is observed.

The high frequency noise 1 is a steadily generated noise and is cancelled by a lowpass filter (not shown) provided in the read/write circuit 33 shown in FIG. 2 and therefore, there is no problem. On the other hand, the switching noise 2 of the VCM driving system has a frequency close to that of read signal, which cannot be cancelled by the lowpass filter in the read/write circuit 33, and therefore, it becomes a problem.

As described above, the hard disk drive of the present invention has been made in such a construction that the noise canceler, comprising the series connected first and second lowpass filters, which is connected in parallel with the VCM, has been provided on the printed circuit board, a connecting point of the first and the second lowpass filters of the noise canceler has been grounded to GND to cancel a noise generating from the VCM driver at the print circuit board side. Therefore, it is certainly possible to cancel a noise that couldn't be cancelled by the noise canceler, that is, a noise leakage component (a high frequency component) by having it flow to the outside (GND).

Consequently, it is possible to prevent a noise of the VCM driving system from introducing in the current line in the cable and to execute the data recording/reproducing operation properly by preventing an adverse effect given to the data line. Thus, data recording/reproducing accuracy of the hard disk drive can be improved.

Furthermore, it is possible to certainly prevent an adverse effect of a noise of the VCM driving system on the data line by arranging a stabilized power line between the current line and the data line in the cable and the noise preventing effect can be further promoted.

What is claimed is:

1. A hard disk drive comprising:
   means for recording/reproducing data on/from a recording medium;
   means for moving the recording/reproducing means on the recording medium;
   means for supplying a driving current to the moving means;
   means for processing data reproduced from the recording/reproducing means of recording data given to the recording/reproducing means;
   cable means for connecting between the current supplying means and moving means as a current line and between the data processing means and the recording/reproducing means as a data line;

means for cancelling noise, the cancelling means including series-connected first and second filters connected to the moving means in parallel with the moving means; and means for grounding the connecting point of the first and the second filters of the noise cancelling means.

2. A hard disk drive according to claim 1 further comprising a circuit board on which the current supplying means, the data processing means and the noise cancelling means are provided.

3. A hard disk drive according to claim 1, wherein the cable means includes a flexible film with conductive wiring patterns printed to form the current line and the data line.

4. A hard disk drive according to claim 3, wherein the cable means comprises a movable portion which moves with the movement of the recording/reproducing means and a fixed portion.

5. A hard disk drive according to claim 4 further comprising means, provided between the recording/reproducing means and the data processing means, for amplifying a signal level of the reproduced data from the recording/reproducing means.

6. A hard disk drive according to claim 5, wherein the amplifying means is provided at the fixed portion of the cable means.

7. A hard disk drive according to claim 4 further comprising a stabilized power line arranged between the current line and the data line in parallel with them in the cable means.

8. A hard disk drive according to claim 7, wherein the stabilized power line is provided at the movable portion of the cable means.

9. A hard disk drive according to claim 1, wherein the moving means includes a voice coil motor.

10. A hard disk drive comprising:

head means for recording/reproducing data on/from a recording medium;

carriage means for supporting the head means;

means for moving the carriage means to move the head means on a recording medium;

means for supplying a driving current to the moving means;

means for processing the data reproduced from the head means or the recording data given to the head means;

a circuit board provided with the current supplying means and the data processing means;

cable means for connecting between the moving means and the current supplying means provided on the circuit board as a current line and between head means and the data processing means provided on the circuit board as a data line;

means for cancelling noise, the noise cancelling means including series-connected first and second filters connected to the moving means in parallel with the moving means; and means for grounding the connecting point of the first and the second filters of the noise cancelling means.

11. A hard disk drive according to claim 10 further comprising a stabilized power line arranged between the current line and the data line in parallel with them in the cable means.

12. A hard disk drive according to claim 11, wherein the cable means includes a flexible film with conductive wiring patterns printed to form the current line and the data line.

13. A hard disk drive according to claim 12, wherein the cable means comprises a movable portion which moves with the movement of the head means and a fixed portion.

14. A hard disk drive according to claim 13 further comprising means, provided between the head means and the data processing means, for amplifying a signal level of the reproduced data from the head means.

15. A hard disk drive according to claim 14, wherein the amplifying means is provided at the fixed portion of the cable means.

16. A hard disk drive according to claim 10, wherein the moving means includes a voice coil motor.

17. A method for cancelling noise in a hard disk drive including means for recording/reproducing data on/from a recording medium, means for moving the recording/reproducing means on the recording medium, means for supplying a driving current to the moving means, and means for processing data reproduced from the recording/reproducing means or recording data given to the recording/reproducing means, the method comprising the steps of:

connecting between the current supplying means and moving means as a current line and between the data processing means and the recording/reproducing means as a data line cancelling noise by using cancelling means including series-connected first and second filters connected to the moving means in parallel with the moving means; and grounding the connecting point of the first and the second filters of the noise cancelling means.

18. A method for cancelling noise in a hard disk drive including head means for recording/reproducing data on/from a recording medium, carriage means for supporting the head means, means for moving the carriage means to move the head means on a recording medium, means for supplying a driving current to the moving means, means for processing the data reproduced from the head means or the recording data given to the head means, and a circuit board provided with the current supplying means and the data processing means, the method comprising the steps of:

connecting between the moving means and the current supplying means provided on the circuit board as a current line and between head means and the data processing means provided on the circuit board as a data line;

cancelling noise by using cancelling means including series-connected first and second filters connected to the moving means in parallel with the moving means; and grounding the connecting point of the first and the second filters of the noise cancelling means.

* * * * *